United States Patent
Zhou et al.

(10) Patent No.: US 11,117,164 B2
(45) Date of Patent: Sep. 14, 2021

(54) EDGE BUILD AND EDGE BLISTER PERFORMANCE OF COIL COATINGS

(71) Applicant: SWIMC LLC, Minneapolis, MN (US)

(72) Inventors: Zhilian Zhou, Sewickley, PA (US); Charles I. Skillman, Zelienople, PA (US); Richard H. Evans, Wexford, PA (US); Nhan T. Huynh, Glenshaw, PA (US)

( * ) Notice: Subject to any disclaimer, the term of this patent is extended or adjusted under 35 U.S.C. 154(b) by 0 days.

(21) Appl. No.: 16/324,344

(22) PCT Filed: Aug. 10, 2017

(86) PCT No.: PCT/US2017/046235
§ 371 (c)(1),
(2) Date: Feb. 8, 2019

(87) PCT Pub. No.: WO2018/031736
PCT Pub. Date: Feb. 15, 2018

(65) Prior Publication Data
US 2019/0168259 A1    Jun. 6, 2019

Related U.S. Application Data

(60) Provisional application No. 62/373,196, filed on Aug. 10, 2016.

(51) Int. Cl.
*B05D 7/14* (2006.01)
*C09D 133/04* (2006.01)
(Continued)

(52) U.S. Cl.
CPC ............. *B05D 7/14* (2013.01); *B05D 3/102* (2013.01); *B05D 3/108* (2013.01); *B65D 25/14* (2013.01);
(Continued)

(58) Field of Classification Search
CPC .......... B05D 7/14; B05D 3/102; B05D 3/108; B05D 1/26; B05D 2202/15;
(Continued)

(56) References Cited

U.S. PATENT DOCUMENTS 5,830,952 A    11/1998 Pedersen et al.
8,722,787 B2    5/2014 Romick et al.
(Continued)

FOREIGN PATENT DOCUMENTS

CA      2916430 A1 *  7/2014    ........... C21D 8/0478
JP      20033062931 A      3/2003
(Continued)

OTHER PUBLICATIONS

Afcona Additives. Slip and Leveling Agents. 2005. 34 pages. Retrieved from http://www.afcona.com.my/pdf/Slip-and-Leveling-agent.pdf on Nov. 24, 2019. (Year: 2005).*
(Continued)

*Primary Examiner* — William P Fletcher, III
(74) *Attorney, Agent, or Firm* — Mueting Raasch Group

(57) ABSTRACT

A liquid polymeric coating composition that upon application to a substrate, such as a coil substrate, preferably does not exhibit the edge build and edge blistering that commonly occurs with conventional liquid polymeric coating compositions. In some embodiments, the liquid polymeric coating composition is modified by tailoring the surface tension, the openness of the coating composition as indicated by the modulus of elasticity, or a combination thereof to reduce edge build and edge blistering. The modified liquid polymeric composition may be applied to a surface of the substrate and cured to form a film coating that reduces or alleviates commonly encountered edge defects in conventional liquid polymeric coating compositions, such as edge build and edge blistering, which may avoid the need for edge
(Continued)

trimming of the coated substrate. The coated coil substrate is well suited for forming food or beverage containers or portions thereof.

17 Claims, 2 Drawing Sheets

(51) Int. Cl.
| | |
|---|---|
| C09D 5/02 | (2006.01) |
| C09D 123/00 | (2006.01) |
| C09D 167/00 | (2006.01) |
| B05D 3/10 | (2006.01) |
| B65D 25/14 | (2006.01) |
| B65D 85/72 | (2006.01) |
| C08K 5/00 | (2006.01) |
| B05D 1/26 | (2006.01) |

(52) U.S. Cl.
CPC ............. B65D 85/72 (2013.01); C09D 5/02 (2013.01); C09D 123/00 (2013.01); C09D 133/04 (2013.01); C09D 167/00 (2013.01); B05D 1/26 (2013.01); B05D 2202/15 (2013.01); B05D 2202/25 (2013.01); B05D 2252/02 (2013.01); B05D 2401/21 (2013.01); B05D 2502/00 (2013.01); B05D 2504/00 (2013.01); B05D 2507/00 (2013.01); B05D 2508/00 (2013.01); C08K 5/0025 (2013.01)

(58) Field of Classification Search
CPC ............ B05D 2401/21; B05D 2502/00; B05D 2504/00; B05D 2507/00; B05D 2508/00; B05D 2202/25; B05D 2252/02; C09D 133/04; C09D 5/02; C09D 123/00; C09D 167/00; B65D 25/14; B65D 85/72; C08K 5/0025
See application file for complete search history.

(56) References Cited

U.S. PATENT DOCUMENTS

| | | | | |
|---|---|---|---|---|
| 8,835,012 | B2* | 9/2014 | O'Brien | C09D 151/08 |
| | | | | 428/461 |
| 9,029,470 | B2 | 5/2015 | Rademacher et al. | |
| 9,181,448 | B2 | 11/2015 | Li et al. | |
| 2012/0118785 | A1* | 5/2012 | Kainz | B65D 25/14 |
| | | | | 206/524.3 |
| 2012/0125801 | A1* | 5/2012 | Kainz | B65D 25/14 |
| | | | | 206/524.3 |
| 2013/0196037 | A1* | 8/2013 | O'Brien | C08F 265/00 |
| | | | | 426/131 |
| 2013/0206756 | A1 | 8/2013 | Niederst et al. | |
| 2014/0076768 | A1 | 3/2014 | Skillman et al. | |
| 2015/0017359 | A1* | 1/2015 | Singer | C09D 143/02 |
| | | | | 428/35.7 |
| 2015/0021323 | A1 | 1/2015 | Niederst et al. | |
| 2015/0147502 | A1* | 5/2015 | Lindenmuth | C08L 23/10 |
| | | | | 428/35.7 |
| 2016/0009941 | A1 | 1/2016 | Rademacher | |
| 2016/0107818 | A1* | 4/2016 | Kaleem | B65D 81/34 |
| | | | | 428/35.7 |
| 2016/0108276 | A1* | 4/2016 | Kaleem | C08F 220/06 |
| | | | | 206/524.3 |
| 2016/0200942 | A1 | 7/2016 | Schottland et al. | |
| 2018/0334544 | A1* | 11/2018 | McVay | C09D 123/08 |

FOREIGN PATENT DOCUMENTS

| | | |
|---|---|---|
| JP | 2005313924 | 11/2005 |
| JP | 2012184330 | 9/2012 |
| WO | WO8701622 | 3/1987 |
| WO | WO03020807 | 3/2003 |
| WO | WO2005080517 | 9/2005 |
| WO | WO2011011705 | 1/2011 |
| WO | WO2011071510 | 6/2011 |
| WO | WO 2015/179064 A1 | 11/2015 |
| WO | WO 2018/031736 A1 | 2/2018 |

OTHER PUBLICATIONS

Radhakrishnan, H. and Scriven, L.E., Edge Effects in Single- and Multi-Layer Drying Coatings, 12th International Coating Science and Technology Symposium, Sep. 20-22, 2004, 6 pages. Retrieved from https://citeseerx.ist.psu.edu/viewdoc/download?doi=10.1.1.497.1620&rep=rep1&type=pdf on Nov. 4, 2020. (Year: 2004).*
International Search Report and Written Opinion for PCT/US2017/046235 dated Nov. 21, 2017.
European Search Report dated Jun. 29, 2020 for European Patent Application No. 17840235.3; 19 pages.
Chinese Office Action for Chinese Patent Application No. 201780062406.4, dated Jan. 25, 2021, 21 pages.
Zhenyu, "Compulsory Standard Certification for Coating Technology," Jilin Photography Publishing House, Sep. 2002, p. 128. English translation of p. 128 only.

* cited by examiner

EDGE BUILD AND EDGE BLISTER PERFORMANCE OF COIL COATINGS

RELATED APPLICATIONS

The present application is a National Phase entry of PCT Application No. PCT/US2017/046235, filed Aug. 10, 2017, which claims priority to U.S. Provisional Application No. 62/373,196 filed Aug. 10, 2016, the contents of each being incorporated herein by reference in their entireties.

TECHNICAL FIELD

This invention relates to protective coating compositions, including water-based coating compositions, and methods for coating metal substrates useful in fabricating, for example, food and beverage containers or portions thereof.

BACKGROUND

A wide variety of protective coatings have been used to coat metal substrates such as the surfaces of packaging articles (e.g., containers) for food and beverage products. The protective coatings are typically thin thermoset polymer films that prevent the food or beverage in the container from coming into contact with the metal surfaces of the containers. The protective coatings also prevent the corrosion of the metal substrate and as a result prevent the contamination and deterioration of the contents.

Protective coatings for fabricating food and beverage containers may be applied to metal substrates and cured into films on high-speed coating lines (e.g., coil coating lines) or onto a planar "continuous" sheet or sheets of a suitable substrate. The protective coating, in liquid form, is typically applied in a roller-coating process either continuously on coil coating lines, or alternatively, batch-wise on sheet coating lines to thin metal substrates (e.g., steel or aluminum metal). The applied coating composition is then cured to form a solid protective coating. The coated metal substrate is then subsequently fabricated into a container, such as a can end or body.

Protective coatings for metal food and beverage containers, and particularly food-contacting coatings, must be substantially defect free and additionally should possess resistance to a wide variety of foods and beverages, should not affect the taste of such products, and should not emit unsuitable amounts of coating materials into such products. In addition, such coatings should have sufficient flexibility to withstand the fabrication and can drop events commonly associated with the production and use of such articles without fracturing and exposing the underlying metal substrate. In some applications, water-based polymeric coating compositions are used to form the protective coatings on metal substrates. Water-based polymeric coatings may exhibit edge build as evidenced by greater coating thicknesses near the periphery of the substrate.

Additionally, water-based polymeric coatings, when applied on coil substrates, often have a tendency to form blisters in the coating, particularly in thicker portions of a coating. Edge build, and edge blisters in areas experiencing edge build, are defects that require trimming of at least a portion of coated metal substrate. With coil substrates, trimming of the edges of a lengthy ribbon can result in undesirable scrap and significant economic loss. Additionally, edge build can result in unstable coils upon the winding or take up of the coated coil substrate. Attempts to address the artifacts of edge build include the staggered winding of the coil upon formation of the coating. However, staggered winding of the coil does not fully address edge build and still does not address edge blistering or the scrap and economic losses associated with the defect.

SUMMARY

This disclosure is directed to a liquid polymeric coating composition that upon application to a substrate, such as a coil substrate, alleviates the edge build and edge blistering that commonly occurs with conventional liquid polymeric coating compositions. In preferred embodiments, such improvements can be achieved without modifying the coating application and curing processes. The liquid polymeric coating composition is preferably modified by tailoring the surface tension, the openness of the coating as indicated by an inflection temperature of its modulus of elasticity-temperature curve, or a combination thereof to reduce or avoid edge build and edge blistering. Additionally, this disclosure addresses a method for coating a coil substrate to reduce or avoid edge build and edge blistering as well as a method for determining operable conditions to prevent such defects. A coated coil substrate based on the application of the liquid polymeric coating composition of this disclosure is well suited for generating food or beverage containers without the need to trim the edges of the coated substrate.

One embodiment of this disclosure includes a liquid polymeric coating composition preferably comprising at least 15% by weight solids, and possessing one or both of (i) a surface tension of at least 31.7 dyne/cm according to the Surface Tension Test, or (ii) an inflection point for a modulus of elasticity of at least 160° C. according to the Dynamic Mechanical Analysis Test Procedure. The liquid polymeric coating composition is preferably a water-based coating system containing a polymeric component, one or more optional crosslinkers, an optional cure catalyst, and one or more optional waxes. In preferred embodiments, the polymeric component includes a "binder" polymer generally applied as a part of protective coatings for food or beverage containers, such as an epoxy polymer, acrylate polymer, polyester polymer, polyolefin polymer, latex polymer or combination or copolymers thereof.

The metal substrate in certain embodiments is a coil substrate, preferably of aluminum, steel or alloys thereof. Coil substrates generally possess a selected thickness and width yet have an extended length that enables a continuous and high-speed coating process. However, the disclosed liquid polymeric coating composition and method of application offer advantages even with batch coating applications for discrete metal substrates such as may occur, for example, with high-speed sheet coating processes employed in manufacturing food or beverage containers or portions thereof.

This disclosure is also directed to a method of coating a metal substrate, particularly a coil substrate, using the liquid polymeric coating composition described herein. The application results in a coated article that experiences little or no edge build and a significant reduction in edge blistering. Substrates with little or no edge build or edge blistering do not require edge trimming of the coated substrate.

Edge build may occur in coated substrates upon application and curing of a liquid or water-based coating. Edge build is the thickening of the coating on the periphery of the substrate upon initial drying and curing. For "continuous" coil substrates, the pertinent edges are the lateral edges extending in the direction of the coil. For sheet coatings, the pertinent edges may include both the lateral edges and the transverse edges. The edge build can be prominent in relatively thick coatings, for example those generally greater than about 6 micrometers in thickness. Without being bound by theory, it is believed that edge build is created upon the initial evaporation of the liquid carrier during the formation of the coating film on the substrate. This disclosure addresses the characteristics of the liquid polymeric coating composition to beneficially address edge build and, in some embodiments, reduce or eliminate the trimming of such defects on coated substrates.

Edge blisters often occur in areas of the coating exhibiting edge build. Without being bound by theory, it is believed that the evaporation rate of the carrier is adversely affected at the edges of the substrate due to the greater coating thickness experienced from edge build. This in turn makes it more difficult for the carrier to completely evaporate, resulting in blister formation internally in the coating. The formation of edge blisters is reduced, and in certain embodiments, alleviated by the liquid polymeric coating composition of this disclosure.

The coated substrate resulting from the liquid polymeric coating of this disclosure is well suited for applications in the food or beverage packaging industry. In certain embodiments, the coated metal substrate is utilized to form interior surfaces of a beverage can, including can ends (e.g., standard "riveted" beverage can ends including a rivet for attaching a pull-tab thereto for purposes of opening a frangible beverage opening or spout to enable a user to consume the packaged beverage product).

DETAILED DESCRIPTION

Figure 1:
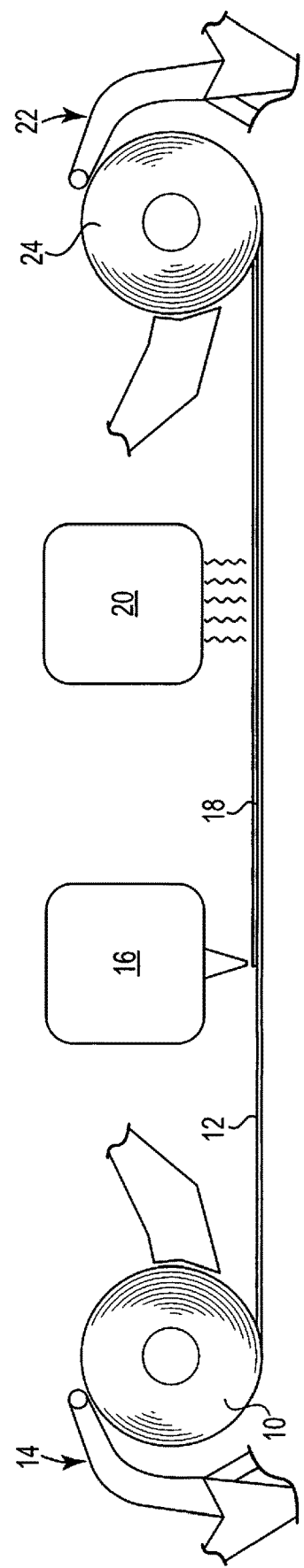
FIG. 1 is a schematic view of a coil substrate coating line suitable for applying the liquid polymeric coating composition of this disclosure.

As used herein, "a," "an," "the," "at least one," and "one or more" are used interchangeably. Thus, for example, a coating composition that contains "a" polymer means that the coating composition includes "one or more" polymers.

The terms "acrylate" and "acrylic" are used broadly herein and encompass materials prepared from, for example, one or more of acrylic acid, methacrylic acid, or any acrylate or methacrylate compound. Thus, for example, a polyetheracrylate copolymer in which the "acrylate" component consists entirely of polymerized (meth)acrylic acid would still include an "acrylate" component even though no (meth) acrylate monomer was employed.

The term "coil substrate" refers to a metal substrate of a selected thickness and width and having a length sufficient to permit the winding of the substrate onto itself.

The term "crosslinker" refers to a molecule capable of forming a covalent linkage between polymers or between two different regions of the same polymer.

The term "edge blisters" refers to internal voids or pockets in a coating generally located at or near the edge of a coating.

The term "edge build" refers an area of greater coating thickness at or adjacent to the periphery of a coated substrate compared to an average thickness across the width of the substrate.

The term "liquid" when used with respect to a coating composition refers to a continuous aqueous phase system, and optionally including one or more water miscible solvents.

The term "(meth)acrylate" is a shorthand reference to acrylate, methacrylate, or combinations thereof, and the term "(meth)acrylic" is a shorthand reference to acrylic, methacrylic, or combinations thereof.

The term "mobile" when used with respect to a compound in a coating composition means that the compound can be extracted from the coating composition when a coating (typically ~1 mg/cm$^2$) is exposed to a test medium for a defined test or set of conditions, depending on the end use. An example of such test conditions includes exposure of the cured coating to HPLC-grade acetonitrile for 24 hours at 25° C. Further exemplary procedures and limits are set out in European Union Commission Directives 82/711/EEC, 93/8/EEC and 97/48/EC and in 21 CFR section 175.300, paragraphs (d) and (e).

The term "modulus of elasticity" refers to the overall resistance to deformation of a material, regardless of whether that deformation is recoverable (elastic) or non-recoverable (viscous).

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

The term "substantially free" when used with respect to a coating composition that may contain a particular mobile compound means that the coating composition contains less than 1,000 parts per million (ppm) of the recited mobile compound. The term "essentially free" when used with respect to a coating composition that may contain a particular mobile compound means that the coating composition contains less than 100 parts per million (ppm) of the recited mobile compound. The term "essentially completely free" when used with respect to a coating composition that may contain a particular mobile compound means that the coating composition contains less than 5 parts per million (ppm) of the recited mobile compound. The term "completely free" when used with respect to a coating composition that may contain a particular mobile compound means that the coating composition contains less than 20 parts per billion (ppb) of the recited mobile compound. If the aforementioned phrases are used without the term "mobile" (e.g., "substantially free of bisphenol A (BPA) compound") then the compositions contain less than the aforementioned amount of the compound whether the compound is mobile in the coating or bound to a constituent of the coating. When the phrases "free of" (outside the context of the aforementioned phrases), "does not include any" and the like are used herein, such phrases are not intended to preclude the presence of trace amounts of the pertinent structure or compound which may be present, e.g., as environmental contaminants.

The term "visible" when used to describe edge blisters refers to those defects that are seen by the human eye without the aid of magnification.

Also herein, the recitations of numerical ranges by endpoints include all numbers subsumed within that range (e.g., 1 to 5 includes 1, 1.5, 2, 2.75, 3, 3.80, 4, 5, and the like).

This disclosure is directed to a method for coating a substrate and to a liquid polymeric coating composition that upon application to a substrate, such as a coil substrate, preferably alleviates the edge build and edge blistering commonly encountered in conventional liquid polymeric coating compositions (e.g., conventional water-based liquid polymeric coating compositions such as BPA-based epoxy acrylate coil coating compositions). Coating defects such as edge build and edge blistering can be reduced or avoided, for example, by designing or modifying a liquid polymeric coating composition with a minimum threshold solids content to exhibit a suitable surface tension, a suitable "openness" of the coating composition as indicated by an inflection point in the modulus of elasticity as a function of temperature, or a combination thereof. Certain preferred embodiments involving a coil substrate coated with the disclosed liquid polymeric coating composition, are well suited for forming food or beverage containers or portions thereof (e.g., riveted beverage can ends).

The metal substrate for receiving the coating may comprise various forms that all include a relatively planar surface suitable for the application of a coating. The metal substrate may take the form of a coil substrate that permits a continuous coating process or a discrete panel for batch coating applications. FIG. 1 depicts a coil substrate 10 suitable for receiving an embodiment of the liquid polymeric coating composition. The coil substrate has a selected width and thickness and possesses enough length to permit the substrate to be wound into a coil. The coil substrate permits a continuous coating process. For example, a surface 12 of the coil substrate 10 is generally exposed to receive a coating. The placement of a coating on the surface 12 of the coil substrate 10 may occur in a continuous manner involving an unwind station 14, a coating station 16 to apply a coating 18, a curing station 20, and a take-up station 22 at the end to rewind the coated coil 24. The modifications to the liquid polymeric coating composition, as presented in this disclosure, reduce or alleviate edge build and edge blister formation on the coated coil.

Edge build may occur in coated substrates upon application and curing of a conventional liquid polymeric coating composition. Edge build is the thickening of the coating on the periphery of the substrate upon initial drying and curing. The edge build can be more prominent in relatively thick coatings, for example those generally greater than about 6 micrometers thick.

Figure 2A:
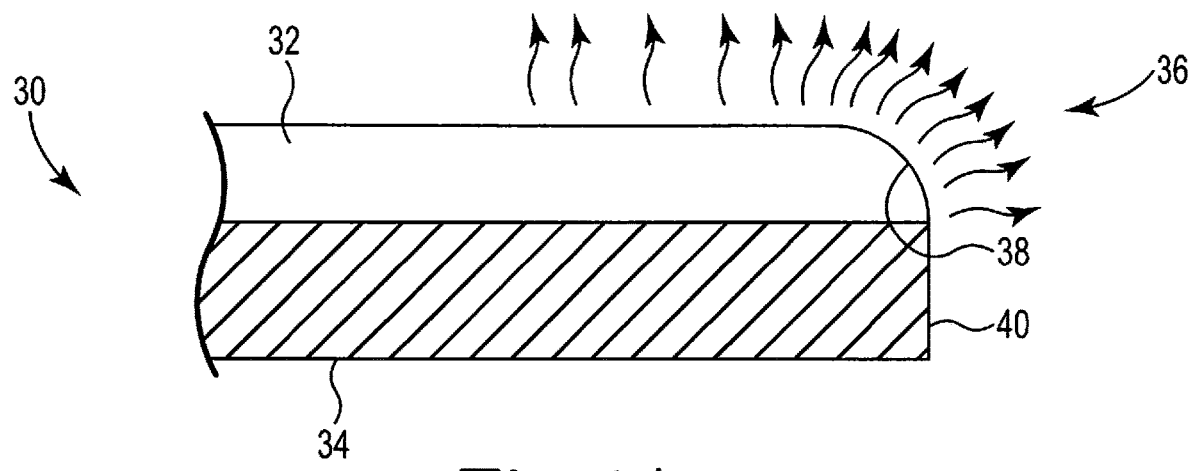
FIG. 2A and FIG. 2B are a series of schematic diagrams depicting an edge portion of a conventional coated substrate and the formation of edge build.
Figure 2B:
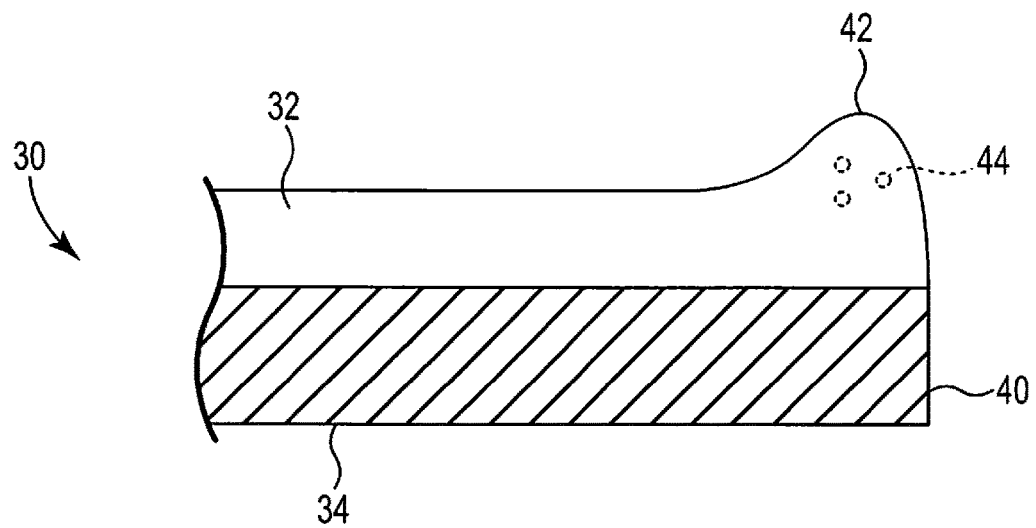

While not intending to be bound by theory, it is believed that edge build is created upon the initial evaporation of the liquid carrier during the formation of the coating film. FIG. 2A represents a portion of a coated substrate 30 having a liquid polymeric coating composition 32 applied onto the substrate 34. FIG. 2A shows liquid coating composition 32 immediately after application to substrate 34. After the liquid polymeric coating composition 32 is applied onto the substrate 34, the liquid carrier begins to evaporate (as illustrated by arrows 36) and the surface tension of the liquid polymeric coating composition 32 gradually increases. As indicated in FIG. 2A, the coating initially exhibits a curved shape 38 at the edge 40 of the substrate 34. The curved shape 38 increases the surface area at the edge 40. A larger surface area leads to increased evaporation of the liquid carrier and in turn an increase in surface tension at the edge 40. As a result, as illustrated in FIG. 2B, a surface tension gradient is created where the liquid polymeric coating composition 32 near edge 40 has higher surface tension than the liquid polymeric coating composition 32 located remotely to the edge 40, thereby creating a surface tension gradient between the edge 40 and the inner area (viz., the interior portion) of the liquid polymeric coating composition. The surface tension gradient results in a driving force for the liquid polymeric coating composition to flow from the inner area to the edge 40 of the substrate 34. This gradient and flow result in edge build 42 at edge 40 of substrate 34 as shown in FIG. 2B. Edge build 42 typically includes visible blisters 44.

The properties of the liquid polymeric coating composition can be selected to achieve a significant reduction and potential elimination of edge defects. In preferred embodiments, the modifications to the liquid polymeric coating composition reduce the magnitude of the surface tension gradient by employing a higher surface tension coating composition. It is believed that modification of the surface tension gradient impacts the fluid dynamic driving forces and reduces the propensity for the liquid polymeric coating composition to move to the edge of the substrate. However, those of ordinary skill in the art will recognize that if the surface tension of the coating composition is too high, it will not sufficiently wet the substrate and create various surface defects, potentially across the entirety of the substrate. For example, with thin aluminum coil substrates, good wetting for example may be observed at surface tension values of about 25 to about 35 dyne/cm under ambient conditions.

Alternatively, or in combination with the surface tension, another mechanism to address edge build involves the modification to the openness of the coating composition before forming a coating film on the substrate. As the carrier liquid evaporates from the coating composition, the coating composition behaves more and more like a solid as it starts to form a film. This process can be monitored by the change in the modulus of elasticity of the coating as a function of temperature measured by Dynamic Mechanical Analysis. The modulus of elasticity of the liquid coating composition may be measured according to the Dynamic Mechanical Analysis Test Procedure, as described below in the Test Methods. During the curing process, as temperature increases and liquid carrier evaporates from the coating composition, the modulus of elasticity also increases. After enough liquid carriers evaporate from the coating composition, the coating behaves more like a solid than a liquid. This change is reflected by a change in the slope of the modulus of elasticity as function of temperature. The inflection point occurring at a specific temperature on a Dynamic Mechanical Analysis curve suggests the onset of solid like behavior. Under the same heating rate, the higher this transition temperature is, the longer the coating composition behaves like a liquid and stays open to allow evaporation of liquid carriers. By manipulating this transition temperature to shift it to a higher value, the coating composition remains open and able to flow for a longer time period. Selectively tailoring the openness of the coating composition assists in minimizing edge build.

Edge blisters often occur in the edge build of a coated substrate generally as a result of the increased thickness of the coating due to edge build. Without being bound by theory, it is believed that the evaporation rate of the carrier is slowed due the thicker coating at the edges of the substrate. In addition, higher surface area and faster solvent evaporation also result in higher viscosity at the edge, making it harder for residual solvents to escape and easier for blisters to form. A reduction of edge build and an increased openness of the coating allow evaporation of the carrier to continue. As a result, the formation of edge blisters is reduced, and in certain embodiments, eliminated.

This disclosure addresses the characteristics of the liquid polymeric coating composition in order to beneficially address edge build and in some embodiments, reduce or even eliminate the adverse trimming of such defects from coated substrates.

In one embodiment, the liquid polymeric coating composition comprises at least 15% by weight solids, and one or both of (i) a surface tension of at least 31.7 dyne/cm according to the Surface Tension Test, and (ii) an inflection point for the modulus of elasticity of at least 160° C. according to the Dynamic Mechanical Analysis Test Procedure. In certain embodiments, the liquid polymeric coating composition has at least 20% by weight solids, preferably at least 25% by weight solids, and even more preferably at least 30% by weight solids. The surface tension may in some embodiments be at least 31.9 dyne/cm, preferably at least 32.1 dyne/cm and more preferably at least 32.5 dyne/cm. In other embodiments, the transition temperature of the modulus of elasticity may be at least 162° C., preferably at least 165° C. and most preferably at least 167° C. In preferred embodiments, the percent solids, the surface tension, the transition temperature of the modulus of elasticity, or combination thereof may be varied to levels that provide a desired film openness and a corresponding reduction in edge build and edge blisters. Various embodiments of the liquid polymeric coating composition when applied to a coil substrate and cured, exhibit an acceptably low level of edge build with no visible blisters, an acceptable coil balance when wound, and no edge scrap or waste lost to edge trimming.

The viscosity of the liquid polymeric coating composition may be controlled to enable sufficient wet out and coverage of the substrate when the coating composition is applied onto the substrate. In some embodiments, the viscosity of the liquid polymeric coating composition be at least about 10 centipoise (cp), at least about 20 cp, or at least about 30 cp, in a shear rate range of 10 to 20,000 reciprocal seconds ($s^{-1}$) as measured at ambient temperature. In some embodiments, the viscosity of the liquid coating composition may be up to about 300 cp, up to about 200 cp or up to about 150 cp, in a shear rate range of 10 to 20,000 reciprocal seconds ($s^{-1}$) as measured at ambient temperature.

The metal substrate generally comprises steel, aluminum, or an alloy thereof. Aluminum substrates, and preferably aluminum coil substrates, provide substrates that are especially useful for food or beverage containers. Certain embodiments employ aluminum substrates having an average thickness of about 175 micrometers to 230 micrometers. In an alternative embodiment, the substrate is treated prior to receiving the coating to enhance the adhesion of a coating onto the substrate. Those of ordinary skill in the art will recognize that treatments with a chromium based compound or a non-chromium based compound can act as a primer on the surface of the coil substrate to enhance the application of the coating.

The coating applied on the surface of the substrate is preferably a liquid polymeric coating composition. The coating composition preferably comprises a polymeric component, an aqueous liquid carrier, one or more optional crosslinkers, an optional catalyst, and an optional wax. The liquid carrier helps deliver the polymeric component to the surface of the substrate to be coated. In certain embodiments, preferred aqueous liquid carriers for use in the coating composition are aqueous media comprising water and optionally one or more additional water miscible solvents. Exemplary water miscible solvents include polar organic solvents such as water miscible alcohols such as isopropyl alcohol, ethanol, methanol, butyl alcohol, or amyl alcohol, diols such as ethylene glycol, or propylene glycol, or glycol ethers such as ethylene glycol monomethyl ether, ethylene glycol monoethyl ether, diethylene glycol monomethyl ether, or diethylene glycol monoethyl ether, ketones such as acetone or methyl ethyl ketone, tetrahydrofuran, glycol esters, and combinations of these. The water miscible solvents are typically liquids at room temperature and form a single liquid phase with water at room temperature. Preferred co-solvents include water miscible glycol ethers, diols, or alcohols. The liquid carrier comprises water and optionally one or more water miscible solvents. In some embodiments, water constitutes at least 25 wt % of the liquid carrier, or preferably at least 50 wt % of the liquid carrier, or preferably at least 75 wt % of the liquid carrier, while the rest of the liquid carrier can be one or more water miscible or soluble solvents. One of ordinary skill in the art will recognize that the selection of water miscible or soluble solvents in a liquid carrier can impact the application and curing of the coating composition on the substrate.

The amount of liquid carrier used in the coating composition may vary over a wide range. If too little liquid carrier is used, then the viscosity of the coating composition may be higher than desired, making it more difficult to obtain high quality coatings in some instances. If too much liquid carrier is used, then the appearance of the coating may be unduly compromised and it may be more difficult to build a desired film thickness. In some embodiments, the liquid carrier may be present in the liquid polymeric coating composition in an amount of about 90 wt % or less, 85 wt % or less, about 80 wt % or less, or about 70 wt % or less based on the total coating composition weight. In other embodiments, the liquid carrier may be present in the liquid polymeric coating composition in an amount of at least 30 wt %, at least 40 wt %, at least 50 wt %, or at least 60 wt % based on the total coating composition weight.

The polymeric component of the liquid polymeric coating composition may include a water dispersible polymer derived from an epoxy polymer and an acrylic polymer. In some embodiments, the epoxy polymer and the acrylic polymer are covalently attached to one another, with the acrylic portion functioning (e.g., via salt groups such as neutralized acid or anhydride groups) to render the copolymer water-dispersible. In certain embodiments, the water-dispersible polymer incorporated into the coating composition is prepared from (i) an epoxy compound, (ii) a linking compound having an unsaturated carbon-carbon bond moiety and a moiety capable of reacting with an epoxy group, and (ii) acrylic monomers, at least some of which are capable of rendering the polymer water dispersible. Such polymers are generally disclosed in U.S. Pat. No. 5,830,952, herein incorporated by reference in its entirety.

In some embodiments, the epoxy compound preferably represents about 5% to about 95%, and more preferably from about 10% to about 90%, by weight of the water-dispersible polymer. Exemplary epoxy compounds include, but are not limited to, DER™ 664, DER 667, DER 668, and DER 669, all available from Dow Chemical Co., Midland, Mich., and EPON 1004, EPON 1007, and EPON 1009, all available from Shell Chemical Co., Houston, Tex. Exemplary bisphenol A (BPA)-free epoxy compounds include, for example, those described in U.S. Patent Application Publication Nos. 2013/0206756 A1 and 2015/0021323 A1 and International Publication No. WO2015/179064 A1.

In such embodiments, the acrylic monomers, after polymerization, represent preferably 5% to about 95%, and more preferably about 10% to about 90%, by weight of the water dispersible polymer. Exemplary acrylic monomers include methyl acrylate, methyl methacrylate, ethyl acrylate, butyl acrylate, cyclohexyl methacrylate ("CHMA"), acrylic acid, methacrylic acid, and mixtures thereof. The water dispersible polymer may also be formed from a mixture of acrylic and vinyl monomers. A preferred vinyl monomer is styrene. In some embodiments, CHMA, or a substituted version of CHMA, may be used in place of styrene. The most preferred monomers for use in such mixture are styrene, CHMA, methacrylic acid, acrylic acid, and mixtures thereof.

In certain embodiments, the polymeric component in the coating composition is a polyester resin. The polyester resin may be a reaction product of components that include a polybasic acid containing at least two carboxyl groups and a polyhydric alcohol containing at least two hydroxyl groups. Preferably, the polyester resin includes an aromatic backbone. In some embodiments, the polyester resin is a reaction product of components that include one or more (or a combination or all of) propylene glycol, trimethylol propane, terephthalic acid, and isophthalic acid, and optionally an unsaturated reactant such as, e.g., maleic anhydride. The unsaturated reactant may also be modified, after incorporation into the polymer, using a pericyclic reaction such as an Ene or Diels-Alder reaction with unsaturated compounds having at least one salt or salt-forming group such as, e.g., sorbic acid. Non-limiting examples of other polyesters suitable for use as the polymeric component in the coating composition include the water-dispersible polyester polymers disclosed in U.S. Patent Application Publication No. 2014/0076768 A1, herein incorporated by reference in its entirety. Other polyester polymers that are suitable for use in coating compositions include those disclosed in U.S. Patent Application Publication No. 2014/0076768, herein incorporated by reference in its entirety.

Certain embodiments may include polyolefins as the polymer in the liquid polymeric coating composition. The polyolefin may include polyolefin homopolymers such as polyethylene or polypropylene, or polyolefin copolymers based on at least one olefin monomer and one or more other olefin or non-olefin monomers. Non-limiting examples of copolymers include ethylene-propylene copolymer, ethylene-1-butene copolymer, and propylene-1-butene copolymer. In certain embodiments, the polyolefins may be functionalized with an ethylenically unsaturated crosslinkable monomer. Non-limiting examples of functionalized polyolefins include polypropylene or polyethylene homopolymer or copolymer in which the polymer has been modified with hydroxyl, amine, aldehyde, epoxide, ethoxylate, carboxylic acid, ester, or anhydride groups. Certain embodiments may employ Hypod™ polyolefin dispersions from The Dow Chemical Company, Midland, Mich., including those polyolefin dispersion disclosed in U.S. Pat. No. 8,722,787.

In certain embodiments, the polymeric component in the coating composition is a latex polymer. Latex polymers are preferably formed by combining an ethylenically unsaturated monomer component with an aqueous dispersion of a salt of an acid- or anhydride-functional polymer (e.g., an acid group- or anhydride group-containing polymer) or other suitable surfactant and an amine or other suitable base, preferably a tertiary amine, and then emulsion polymerizing the ethylenically unsaturated monomer component. In other embodiments, the latex polymer is alternatively formed by combining the ethylenically unsaturated monomer component with an aqueous dispersion of a polymer salt or other water-dispersible polymer or surfactant, which may or may not include neutralized acid or anhydride groups. In certain embodiments, the acid- or anhydride-functional polymer includes an acid- or anhydride-functional acrylic polymer, acid- or anhydride-functional alkyd resin, acid- or anhydride-functional polyester resin, acid- or anhydride functional polyurethane, acid- or anhydride-functional polyolefin (e.g., a (poly)ethylene (meth)acrylic acid copolymer), or combinations thereof. Preferably, the acid- or anhydride-functional polymer includes an acid functional acrylic polymer. In other embodiments, the polymer (e.g., acrylic, alkyd, polyester, or polyurethane) used to form the aqueous dispersion may include any suitable combination of salt groups, salt-forming groups, or non-ionic water-dispersing groups. Non-limiting examples of latex polymers suitable for use as the polymeric component in the coating composition may include the latex polymers disclosed in U.S. Pat. Nos. 8,835,012, 9,029,470, 9,181,448, or U.S. App. No. 20160009941 A1 or (e.g., a (poly)ethylene (meth)acrylic acid copolymer), each of which is herein incorporated by reference in its entirety.

The coating composition of this disclosure may include the one or more polymers in a range of amounts capable of producing improvements in edge build and edge blister performance. In certain embodiments, the one or more polymers are present in a total amount of at least 50 wt %, at least 60 wt %, or at least 70 wt %, based on the total weight of the dry coating film. In certain embodiments, one or more polymers are present in a total amount of no greater than 80 wt %, no greater than 90 wt %, no greater than 95 wt %, or up to 100 wt %, based on the total weight of the dry coating film.

In some embodiments, the liquid polymeric coating compositions are substantially free of BPA (including epoxides thereof such as bisphenol A diglycidyl ether (BADGE)), more preferably essentially free of BPA, even more preferably essentially completely free of BPA, and optimally completely free of BPA. In addition, in some embodiments, the coating compositions are also substantially free, more preferably essentially free, even more preferably essentially completely free, and optimally completely free of each of bisphenol S and bisphenol F, including epoxides thereof.

One or more optional crosslinkers may be used in the liquid polymeric coating composition. The choice of any particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker.

Preferred crosslinkers are substantially free of mobile or bound bisphenol A (BPA) and bisphenol A diglycidyl ether (BADGE) and more preferably completely free of mobile or bound BPA and BADGE. Suitable examples of such crosslinkers are hydroxyl-reactive curing resins such as phenoplasts, aminoplast, blocked or unblocked isocyanates, or mixtures thereof.

Suitable phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, or any other polyhydric phenols.

Suitable aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinkers include, without limitation, benzoguanamine-formaldehyde resins, melamine-formaldehyde resins, etherified melamine-formaldehyde, and urea-formaldehyde resins.

Examples of other generally suitable crosslinkers are the blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000. Examples of suitable polymeric blocked isocyanates include a biuret or isocyanurate of a diisocyanate, a trifunctional "trimer," or a mixture thereof. Examples of suitable blocked polymeric isocyanates include TRIXENE™ BI 7951, TRIXENE BI 7984, TRIXENE BI 7963, TRIXENE BI 7981 (TRIXENE materials are available from Baxenden Chemicals, Ltd., Accrington, Lancashire, England), DESMODUR BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (DESMODUR materials are available from Bayer Corp., Pittsburgh, Pa., USA), or combinations thereof. Examples of suitable trimers may include a trimerization product prepared from on average three diisocyanate molecules or a trimer prepared from on average three moles of diisocyanate reacted with one mole of another compound such as, for example, a triol (e.g., trimethylolpropane).

The level of crosslinker, when optionally employed, will typically depend on the type of crosslinker, the time and temperature of the curing cycle, the molecular weight of the polymeric component, and the desired coating properties. If used, the crosslinker is typically present in an amount of up to 50 wt %, preferably up to 30 wt %, and more preferably up to 15 wt %. If used, a crosslinker is preferably present in an amount of at least 0.1 wt %, more preferably at least 1 wt %, and even more preferably at least 1.5 wt %. The weight percentages are based on the total weight of the dry coating film.

The liquid polymeric coating compositions of this disclosure may also include a catalyst, e.g., for purposes of enhancing coating cure or the extent of crosslinking. Catalysts suitable for use with the liquid polymeric coating composition include amines, hydroxides, phosphonium salts, and the like, and may be selected by those of ordinary skill in the art based on the one or more polymers in the liquid polymeric coating composition.

The catalyst, if used, typically will be employed at a level that provides the desired degree and rate of cure. In certain embodiments, one or more catalysts are present in a total amount of at least 0.03 wt %, at least 0.05 wt %, or at least 0.06 wt %, based on the total weight of the dry coating film. In certain embodiments, one or more catalysts are present in a total amount of no greater than 5 wt %, no greater than 3 wt %, or no greater than 1 wt %, based on the total weight of the dry coating film.

The liquid polymeric coating composition can be modified to beneficially address edge build and edge blister performance in a coating composition demonstrating such defects. The teaching of this disclosure may be applied to various liquid polymeric coating compositions to optimize the coating process and achieve desired end state coating properties. For example, the properties of the liquid carrier can be modified to beneficially impact the characteristics and performance of the coating composition or the finished coating. One of ordinary skill in the art with knowledge of this disclosure will recognize that a selected coating composition that exhibits edge build may be modified to reduce or eliminate the defect by adjusting the properties of the liquid polymeric coating composition. This may, for example, be accomplished by increasing the surface tension of the liquid polymeric coating composition by at least 5%, at least 7%, or at least 10% (as measured in dynes per centimeter using the Surface Tension Test) above the surface tension of the composition in the initial form in which it demonstrated edge defects prior to modification. In other embodiments, increasing the openness of the coating as indicated by the inflection point temperature of the modulus of elasticity may be accomplished by increasing the inflection point temperature by at least 8%, at least 12%, or at least 15% above the inflection point temperature of the composition in the initial form in which it demonstrated edge defects prior to modification, as measured in degrees Celsius by the Dynamic Mechanical Analysis Test Procedure. Combinations of the two modifications may also achieve beneficial reduction in edge build or edge blistering. Illustrative embodiments of the coating composition have formed coatings on coil substrates having coating average thicknesses, as defined in the Examples of this disclosure, at edges of the substrate varying no greater than 50%, no greater than 30%, no greater than 25%, and preferably no greater than 15%, from the average coating thickness away from the edge in a cross-substrate direction.

Modifications to surface tension or the openness of the coating as may be achieved by varying the ratio of components in the solvent, by replacing some solvent of lower surface tension with solvent of higher surface tension, or by replacing some solvent of lower boiling point with solvent with higher boiling temperature. A non-limiting example includes the replacement of isopropyl alcohol, having a surface tension of 21.7 dynes/cm and a boiling point of about 82.5° C., with isobutyl alcohol having a surface tension of 23.0 dynes/cm and a boiling point of 108° C. Another non-limiting example includes the replacement of a mixture of isopropyl alcohol and amyl alcohol, having a surface tension of 23.7 dynes/cm and a boiling point of about 138.5° C., with propylene glycol mono methyl ether, having a surface tension of 27.7 dynes/cm and a boiling point of about 119° C. Another non-limiting example includes the replacement of propylene glycol, having a surface tension of 36.0 dynes/cm and a boiling point of about 187.3° C., with ethylene glycol having a surface tension of 47.7 dynes/cm and a boiling point of 197.3° C. Those of ordinary skill in the art will recognize that the selection of specific co-solvents in the aqueous liquid carrier may vary depending on the specific polymer selected in the liquid polymer coating composition and other ingredients that may be present.

In other embodiments, the structure of the polymer in the liquid polymer coating composition may be modified to provide the desired film openness and a corresponding reduction in edge build and edge blisters. The polymer modifications may, for example, alter the polymer molecular weight, aromaticity, constituents on the aromatic groups, or combinations thereof to achieve the desired surface tension and modulus of elasticity and enhance the openness of the film.

In certain embodiments, the liquid polymeric coating composition is generally applied in a conventional roller coating process either continuously on coil lines or batchwise on substrate sheets. For example, in some embodiments, the moving surface of a coil substrate in a continuous process is traveling at a line speed of at least about 50 meters per minute, at least about 100 meters per minute, at least about 200 meters per minute, or at least about 300 meters per minute. Typically, the line speed will be less than about 400 meters per minute. For such continuously moving surfaces, the liquid polymeric coating composition is typically applied at coating weights and relative thicknesses to achieve a desired average coating thickness upon curing. In certain embodiments, the resulting dry film weight on the substrate may be at least about 7 grams per square meter, at least about 8 grams per square meter, or at least about 9 grams per square meter, and may be up to about 11 grams per square meter, up to about 12 grams per square meter, or up to about 15 grams per square meter. Once applied onto the substrate, any suitable cure mechanism may be employed. For example, the coating composition can be subjected to thermal convection, ultraviolet radiation, electromagnetic magnetic radiation or combinations thereof in a curing cycle that provides sufficient drying and curing of the coating composition to form a desired final coating.

In certain preferred embodiments, the curing time of the coating compositions of this disclosure is at least about 6 seconds, at least about 10 seconds or at least about 12 seconds, and up to about 20 seconds, up to about 25 seconds or up to about 30 seconds. In the context of thermal bakes to cure the coating, such curing times refer to the residence time in the oven(s). In such embodiments, the curing process is typically conducted to achieve peak metal temperatures of about 200° C. to about 260° C. Those of ordinary skill in the art with knowledge of this disclosure are capable of selecting curing processes and operating conditions based on upon the liquid polymeric coating composition chosen for an application.

The cured coating resulting from the liquid polymeric coating composition preferably exhibits reduced and desirably negligible edge build and edge blistering. Edge build may be determined by measuring the average thickness of the coating at the lateral edge of the coated substrate and subtracting the average thickness of the coating away from the edges in a cross-substrate direction. If present, edge build and edge blistering typically occur within the first 2 mm to about the first 5 mm from the edge, and may be evaluated using the Edge Build Test procedure, set forth in the Test Methods section. For example, certain embodiments produce cured coatings on a coil substrate having an average thickness at lateral edges of the coil substrate varying no more than 50% from an average coating thickness away from the edges in a cross-substrate direction. In other embodiments, coatings on a coil substrate having an average thickness at the lateral edges of the coil substrate preferably vary no more than 30%, no more than 15%, or no more than 10% from an average coating thickness away from the edges in a cross-substrate direction. For certain applications, the average thickness of the coating away from the edges in a cross substrate direction may range from about 7, 8 or 9 micrometers to about 11, 12, 13, or 15 micrometers. In such applications, the variation of the average thickness of the coating at the edge of the substrate may, for example, vary from less than 7 micrometers, less than 6 micrometers, less than 4 micrometers, and preferably less than 2 micrometers from the average thickness of the coating away from the edges in a cross-substrate direction. Additionally, preferred embodiments are free of any visible blisters. Edge blisters at the lateral edges of the coated substrate may for example be measured by visually inspecting three 10 meter sections of the edge of the coated substrate.

For purposes of this disclosure, the average edge build thickness is preferably determined by measuring the average thickness at the edges of the coil substrate and using the method recited in the Test Methods section. Alternatively, film thickness differences can be measured by using an optical surface profilometer. Film thickness differences may also be measured by cross sectioning at the point of interest and measuring the film thickness using microscopic techniques such as a visual microscope, scanning electron microscope, etc. The edge build of the coating may be calculated in a manner similar to the Edge Build Measurement test by determining the numerical difference in the recorded measurements.

The coated metal substrates may be shaped to form the desired metal packaging articles by processes such as, for example, deep-drawing, stamping, creasing and flanging. The coated substrates, or at least a portion thereof, can be fabricated into formed articles such as 2-piece drawn food cans, 3-piece food cans, food can ends, drawn and ironed cans, beverage can ends and the like. These processes and articles may require very high flexibility and excellent coating adhesion. In such processes and articles, the coatings preferably should not experience any change in the protective function due to reshaping and, in addition, should preferably retain adequate adhesion and an intact surface. The disclosed coatings are especially useful as the interior food-contact coating for food and beverage cans.

Embodiments of the liquid polymeric coating composition directed to a food or beverage can end should preferably exhibit sufficient flexibility in the cured coating composition to accommodate the extreme contour of the rivet portion of the easy can end. One test conducted to determine if a particular coating can function as a can end is the Porosity Test, set forth in the Test Methods section. The Porosity Test indicates the level of flexibility of a coating and measures the ability of the coating to retain its integrity as it undergoes the formation process necessary to produce a food or beverage can end. In particular, it is a measure of the presence or absence of cracks or fractures in the interior coating of the formed end.

Test Procedures

The below test methods may be useful in evaluating certain properties of various embodiments of the present invention.

The Surface Tension Test.

The test is conducted using a Krüss K100 tensiometer at room temperature (20° C.). After the instrument is turned on, a minimum warm up time of 2 hours is applied before any measurement. A thoroughly cleaned platinum plate is used as the measurement probe. The dimension of the platinum plate is as follows: width=19.900 mm (millimeters), thickness=0.200 mm, height=10.000 mm. For each measurement, at least 70 milliliters (ml) of coating sample is placed into a 300 milliliter glass jar to provide enough sample depth. The surface of the liquid coating sample is brought close to the measurement probe (platinum plate) at a distance of about 4-6 mm. Once the test starts, the instrument moves the sample closer to the measurement probe, and signals when the probe first touches the liquid surface. The following testing parameters are used: Detection speed=10 mm/min, detection sensitivity=0.005 grams, immersion depth=2.0 mm, acquisition=linear, max measurement time=300 seconds; Termination conditions: values for mean=5, standard deviation=0.1 mN/meter. Once the platinum plate is in contact with the liquid surface, surface tension acts on the plate, causing a vertical force that can be detected by a force sensor. The surface tension is calculated from the measured force and the wetted length of the plate. After the testing is completed, the surface tension is reported in dynes/cm.

The Dynamic Mechanical Analysis Test Procedure.

The test may be utilized for determining the cure behavior of thermoset coating compositions. The Dynamic Mechanical Analysis ("DMA") Test Procedure is similar to the ASTM-D4473-08 test method using the Supported Technique with Film Fiber Tension Clamp. A TA Instruments Q800 dynamic mechanical analyzer was used in conjunction with TA Instruments TRIOS software package to analyze experimental measurements for measured transitions and behaviors. To assess the cure performance of the coating, the mechanical response of the sample was measured as a function of temperature at a heating rate of 5° C./min. Two drops of wet coating were applied to a substrate of negligible stiffness (ASTM-D4473-08), a Kimwipe™ paper strip that is cut with dimensions: 10 to 15 mm long, 7 to 10 mm wide, with a thickness of approximately 0.085 mm. The samples wet out the Kimwipe support and were then loaded onto the film-fiber tension clamp of the dynamic mechanical analyzer. The sample was initially heated from room temperature to a peak temperature of 224° C. at a ramp rate of 5° C./min and held there for 1 minute to cure the sample. The sample was then equilibrated at 30° C. by purging the sample with liquid nitrogen. The sample was held isothermally at 30° C. for 5 minutes. The sample was then heated at a rate of 3° C./min to 175° C. in order to measure the cured mechanical properties of the coating. Throughout the test, the sample is deformed at constant strain amplitude (0.1%) and frequency (1 Hz) in the dynamic mechanical analyzer as the temperature is increased to measure the change in viscoelastic properties with temperature. A static force of 0.01 N is applied to the sample at the beginning of the test to keep the sample in tension with a Force Track of 125%. The amplitude applied to the sample in the temperature ramp is sufficiently small such that the sample is not taken to failure and can be tested repeatedly using the same experimental conditions.

Edge Build Measurement Test.

The average thickness of edge build is determined by the Edge Build Measurement Test. Edge build is determined by determining the average thickness difference of the coating at the edge of the substrate against points on the coating away from the edge. Since the substrate thickness is generally the same at the edge and away from the edge, edge build can be calculated by measuring the average thickness of the coated substrate at the edge and away from the edge, and then subtracting one from the other. Thickness of the coated substrate at the edge is measured by a micrometer along the edge in areas less than 2 mm from the left or right edge of the substrate. At least 20 measurements are taken, and the average of those values is calculated and taken as the thickness at the edge. Thickness away from the edge is measured in areas at least 20 mm away from either edge. At least 40 measurements were taken across the width of the substrate, and the average is calculated and taken as the thickness away from the edge. The edge build is calculated as: Edge Build=Average Thickness at the edge−Average thickness away from the edge.

Porosity Test.

The Porosity Test is conducted by placing a coated beverage can end on a cup filled with an electrolyte solution. The cup is inverted to expose the interior coated surface of the can end to the electrolyte solution. The amount of electrical current that passes through the end is then measured. If the coating remains intact (no cracks or fractures) after fabrication, minimal current will pass through the end. For the present evaluation, fully converted 202 standard opening can ends (which are "riveted" aluminum beverage can ends) are exposed for a period of 4 seconds to an electrolyte solution containing 1% NaCl by weight in deionized water. Metal exposures are measured using a WACO Enamel Rater II, available from the Wilkens-Anderson Company, Chicago, Ill., with an output voltage of 6.3 volts. The measured electrical current is reported in milliamps. End continuities are typically tested initially and then after the ends are subjected to pasteurization or retort. A coating is considered to satisfy the Porosity Test if it passes an electric current (after end formation) of less than about 10 milliamps (mA) when tested as described above. Preferred coatings pass the initial test with less than 5 milliamps (mA), more preferably less than 2 mA, and even more preferably less than 1 mA.

EXAMPLES

Examples 1-3 and Comparative Example 1

The liquid polymeric coating compositions of Examples 1-3 and Comparative Example 1 were formulated using the polymeric components and solvents set forth in Table 1. Solvent Packages 1 and 2 served as the aqueous liquid carriers in the liquid polymeric coating composition. Solvent Package 1 included an aqueous mixture that included miscible alcohols, diols and glycol ethers. Solvent Package 2 was created by modifying Solvent Package 1. The modifications included replacing alcohol or glycol ether solvents in Solvent Package 1 with other alcohol or glycol ether solvents having higher surface tensions, boiling points or both. A phenolic crosslinker and a carnauba wax was then added to the liquid polymeric coating composition under agitation. The solvent package was added under agitation. The liquid polymeric coating compositions from Examples 1-3 and Comparative Example 1 were deposited onto a chromium pretreated aluminum substrate, A272 aluminum from Alcoa, Inc., Pittsburgh, Pa. Additionally, Example 3 and Comparative Example 1 were deposited onto an untreated aluminum substrate, Betz 1903 aluminum, Logan Aluminum, Russellville, Ky. The coatings were applied onto the substrates using a reverse roll coating process at two different line speeds, 60 meter/minute and 213 meter/minute to achieve a targeted dry film thickness at about 7 milligrams per square inch (11 gram per square meter) or a targeted film thickness of about 11 micrometers. A peak metal temperature of about 232° C. and at a curing time about 10 seconds was employed to achieve a cured coating. The average coating thickness and edge build were determined using the Edge Build Measurement test. Edge blisters were determined by visually inspecting (via unaided human eye) three 10 meter sections of coated coil substrate. The results are reported in Table 2. Examples 1 through 3 exhibited very little edge build while Comparative Example 1 had substantial edge build. The results indicate that edge build and edge blisters can be beneficially reduced or eliminated by increasing either the surface tension of the coating composition, the openness of the coating composition, or both. Additionally, the Porosity Test was conducted on Examples 1-3 and indicated that all Examples tested had an initial porosity less than one 1 mA.

TABLE 1

Materials and Properties

| Material | Description of the polymeric component | Solvent Package | Other components | Surface Tension, dyne/cm | Modulus of Elasticity Inflection Temperature per DMA, °C |
|---|---|---|---|---|---|
| Comparative Coating 1 | Acid functional polyether acrylate copolymer formed from reactants including bisphenol A (BPA) and the diglycidyl ether of bisphenol A. | water and miscible solvent mixture 1 | crosslinker, wax | 31.5 | 145 |
| Coating 1 | Acid functional polyether acrylate copolymer formed from reactants including bisphenol A (BPA) and the diglycidyl ether of bisphenol A. | Water and miscible solvent mixture 2 | crosslinker, wax | 33.9 | 165 |
| Coating 2 | BPA-free acid functional polyether acrylate copolymer formed from reactants including hydroquinone and the diglycidyl ether of tetra methyl bisphenol F. | water and miscible solvent mixture 1 | crosslinker, wax | 31.9 | 169 |
| Coating 3 | BPA-free acid functional polyether acrylate copolymer formed from reactants including hydroquinone and the diglycidyl ether of tetra methyl bisphenol F. | water and miscible solvent mixture 2 | crosslinker, wax | 34.0 | 174 |

TABLE 2

Results

| Example | Substrate | Line Speed, meters/minute | Average Film Thickness, μm | Edge Build, μm | Edge Blisters Visible? |
|---|---|---|---|---|---|
| Comparative 1 | 1 | 60 | 11 | 5 | Yes |
| 1 | 1 | 60 | 11 | 2 | No |
| 2 | 1 | 60 | 11 | 3 | No |
| 3 | 1 | 60 | 11 | 2 | No |
| Comparative 1 | 2 | 213 | 11 | 8 | Yes |
| 3 | 2 | 213 | 11 | 2 | No |

Having thus described preferred embodiments of the present invention, those of skill in the art will readily appreciate that the teachings found herein may be applied to yet other embodiments within the scope of the claims hereto attached.

What is claimed is:

1. A method comprising:
applying a liquid polymeric coating composition to a surface of a coil substrate on a continuously moving surface traveling at a line speed of about 200 meters per minute to about 400 meters per minute, the coil substrate comprising aluminum and having opposing lateral edges and an average thickness of 175 μm to 230 μm,
wherein the liquid polymeric coating composition comprises:
a polyolefin polymer, a polyether acrylate copolymer, a polyester acrylate copolymer, or a combination thereof,
an aqueous liquid carrier comprising water and one or more water miscible organic solvents, and
one or more optional crosslinkers, and
wherein the liquid polymeric coating composition comprises at least 15% by weight solids, and exhibits
(i) a surface tension of at least 31.7 dyne/cm according to the Surface Tension Test, and
(ii) an inflection point for a modulus of elasticity of at least 160° C. according to the Dynamic Mechanical Analysis Test Procedure, and
curing the liquid polymeric coating composition to form a coating on the surface of the coil substrate,
wherein the coating has an average thickness of 7 μm to 15 μm measured at least 20 mm away from the lateral edges of the coil substrate, and
wherein, in the absence of any cutting along the lateral edges after application of the coating composition, at less than 2 mm from the lateral edges of the coil substrate, the coating has an average thickness varying no more than 30% from the average thickness of the coating at least 20 mm away from the lateral edges in a cross-substrate direction.

2. The method according to claim 1, wherein at least 25 wt % of the aqueous liquid carrier constitutes water.

3. The method according to claim 2, wherein the crosslinker is present and comprises one or more phenoplasts, aminoplasts, blocked or unblocked isocyanates, or a mixture thereof.

4. The method according to claim 1, wherein the coil substrate is pretreated with a chromium-based compound or a non-chromium-based compound before applying the liquid polymeric coating composition.

5. The method according to claim 1, wherein the coating is an interior food-contact coating suitable for use on an interior of a riveted food or beverage can end.

6. The method according to claim 5, wherein the interior food-contact coating on the food or beverage can end passes less than 10 milliamps of current when tested in accordance with the Porosity Test for initial porosity.

7. The method according to claim 1, wherein the one or more water miscible solvents is isopropyl alcohol, ethanol, methanol, butyl alcohol, amyl alcohol, ethylene glycol, propylene glycol, ethylene glycol monomethyl ether, ethylene glycol monoethyl ether, diethylene glycol monomethyl ether, diethylene glycol monoethyl ether, acetone, methyl ethyl ketone, tetrahydrofuran, glycol esters, or a combination thereof.

8. A food or beverage container, or a portion thereof, comprising:
    an aluminum substrate having an average thickness of 175 µm to 230 µm, wherein at least a portion of the aluminum substrate is coated with a coating prepared from a liquid polymeric coating composition comprising:
        a polyolefin polymer, a polyether acrylate copolymer, a polyester acrylate copolymer, or a combination thereof,
        an aqueous liquid carrier comprising water and one or more water miscible organic solvents,
        an optional crosslinker, an optional catalyst, and an optional wax,
    wherein the liquid polymeric coating composition possesses (i) a surface tension of at least 31.7 dyne/cm according to the Surface Tension Test, and (ii) an inflection point for a modulus of elasticity of at least 160° C. according to the Dynamic Mechanical Analysis Test Procedure, and
    wherein the coating has an average thickness of 7 µm to 15 µm.

9. The food or beverage container according to claim 8, wherein the coating is an interior food-contact coating of a riveted food or beverage can end.

10. The food or beverage container according to claim 8, wherein at least 25 wt % of the aqueous liquid carrier constitutes water.

11. The food or beverage container according to claim 8, wherein the liquid polymeric coating composition comprises at least 15 wt % solids.

12. The food or beverage container according to claim 8, wherein the one or more water miscible solvents is isopropyl alcohol, ethanol, methanol, butyl alcohol, amyl alcohol, ethylene glycol, propylene glycol, ethylene glycol monomethyl ether, ethylene glycol monoethyl ether, diethylene glycol monomethyl ether, diethylene glycol monoethyl ether, acetone, methyl ethyl ketone, tetrahydrofuran, glycol esters, or a combination thereof.

13. A composition capable of forming an interior food-contact coating of an aluminum food or beverage container, the composition comprising a liquid polymeric coating composition, wherein the liquid polymeric coating composition comprises:
    a polyolefin polymer, a polyether acrylate copolymer, a polyester acrylate copolymer, or a combination thereof,
    an aqueous liquid carrier comprising water and one or more water miscible organic solvents,
    and one or more optional crosslinkers, and
    wherein the liquid polymeric coating composition comprises at least 15% by weight solids, and possesses (i) a surface tension of at least 31.7 dyne/cm according to the Surface Tension Test, and (ii) an inflection point for modulus of elasticity of at least 160° C. according to the Dynamic Mechanical Analysis Test Procedure.

14. The composition according to claim 13, wherein the liquid polymeric coating composition has a viscosity of about 10 cp to about 300 cp, in a shear rate range of 10 to 20,000 ($s^{-1}$).

15. The composition according to claim 13, wherein at least 25 wt % of the aqueous liquid carrier constitutes water.

16. The composition according to claim 13, wherein the crosslinker is present and comprises one or more phenoplasts, aminoplasts, blocked or unblocked isocyanates, or a mixture thereof.

17. The method according to claim 13, wherein the one or more water miscible solvents is isopropyl alcohol, ethanol, methanol, butyl alcohol, amyl alcohol, ethylene glycol, propylene glycol, ethylene glycol monomethyl ether, ethylene glycol monoethyl ether, diethylene glycol monomethyl ether, diethylene glycol monoethyl ether, acetone, methyl ethyl ketone, tetrahydrofuran, glycol esters, or a combination thereof.

* * * * *